Z. S. DURFEE.
Fire-Boxes for Locomotives and other Boilers.
No. 167,079. Patented Aug. 24, 1875.
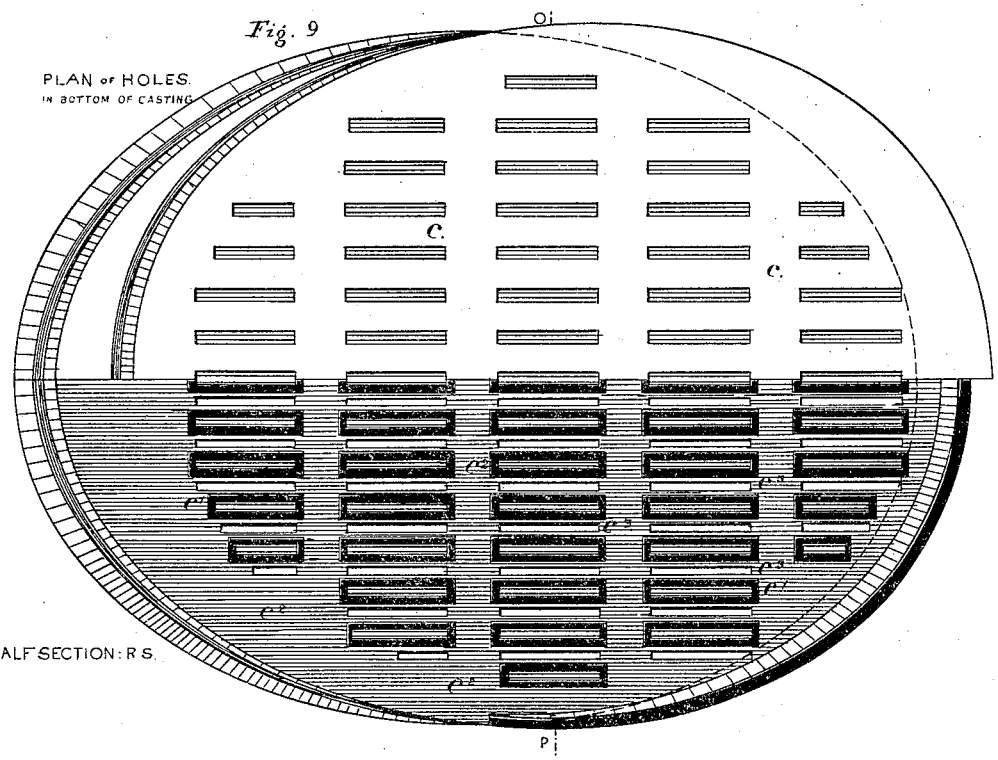
Fig. 9
PLAN OF HOLES IN BOTTOM OF CASTING
HALF SECTION: R S.
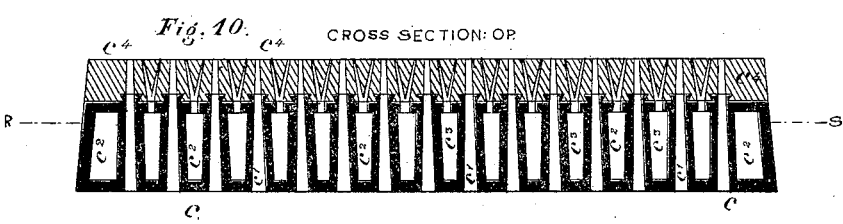
Fig. 10. CROSS SECTION: O P.
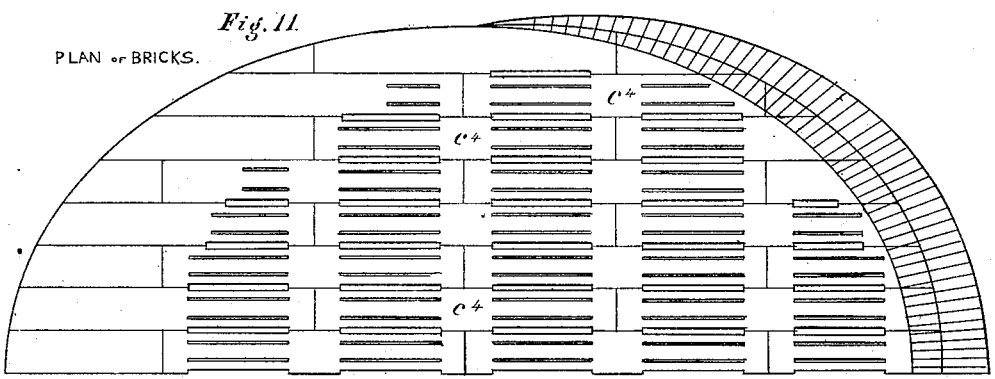
Fig. 11.
PLAN OF BRICKS.
Witnesses:
Inventor:
Z. S. Durfee 5 Sheets--Sheet 4.

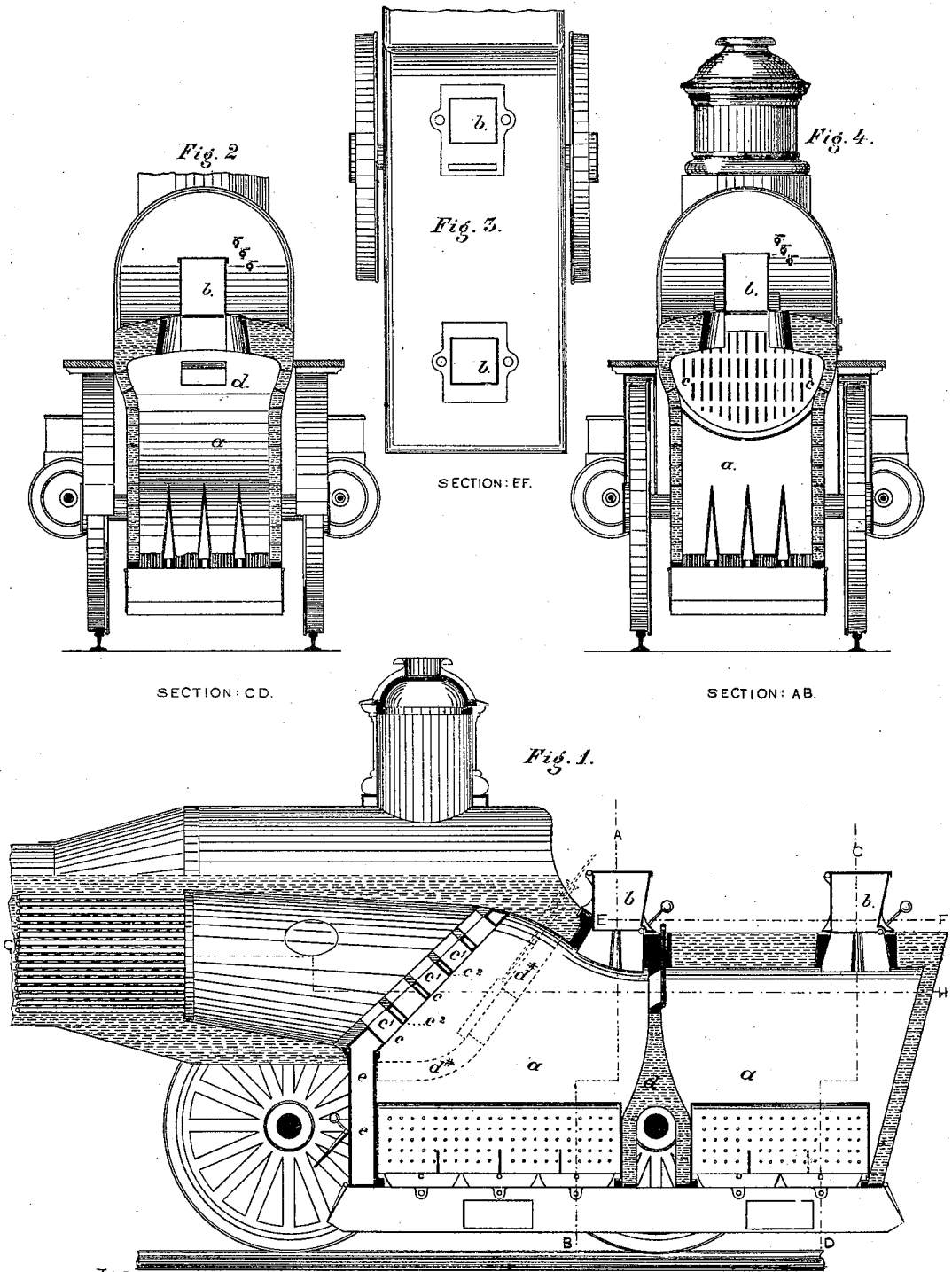

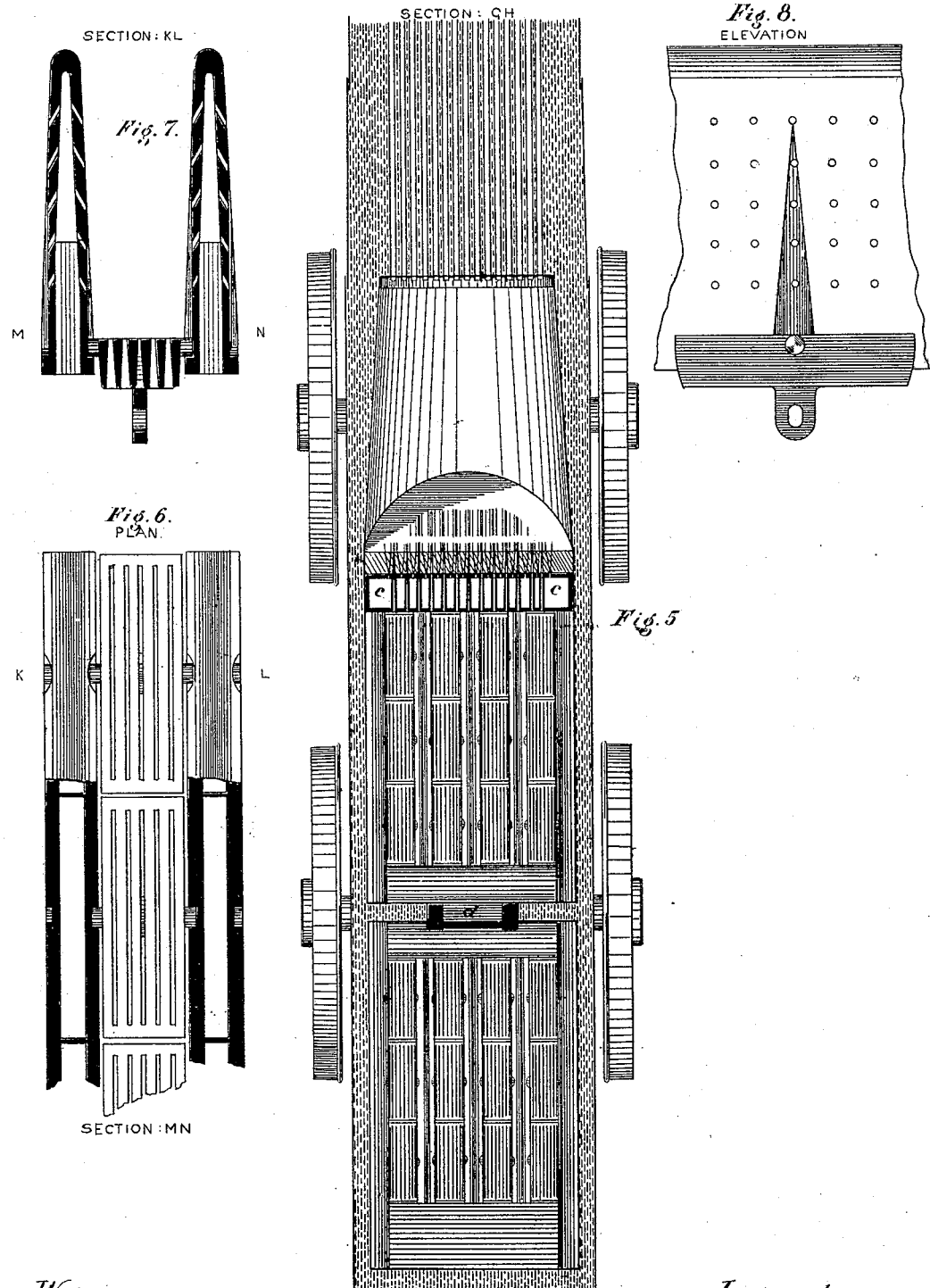

Z. S. DURFEE.
Fire-Boxes for Locomotives and other Boilers.

No. 167,079. Patented Aug. 24, 1875.

Witnesses:
J. B. White
F. W. Edmund

Inventor,
Z. S. Durfee

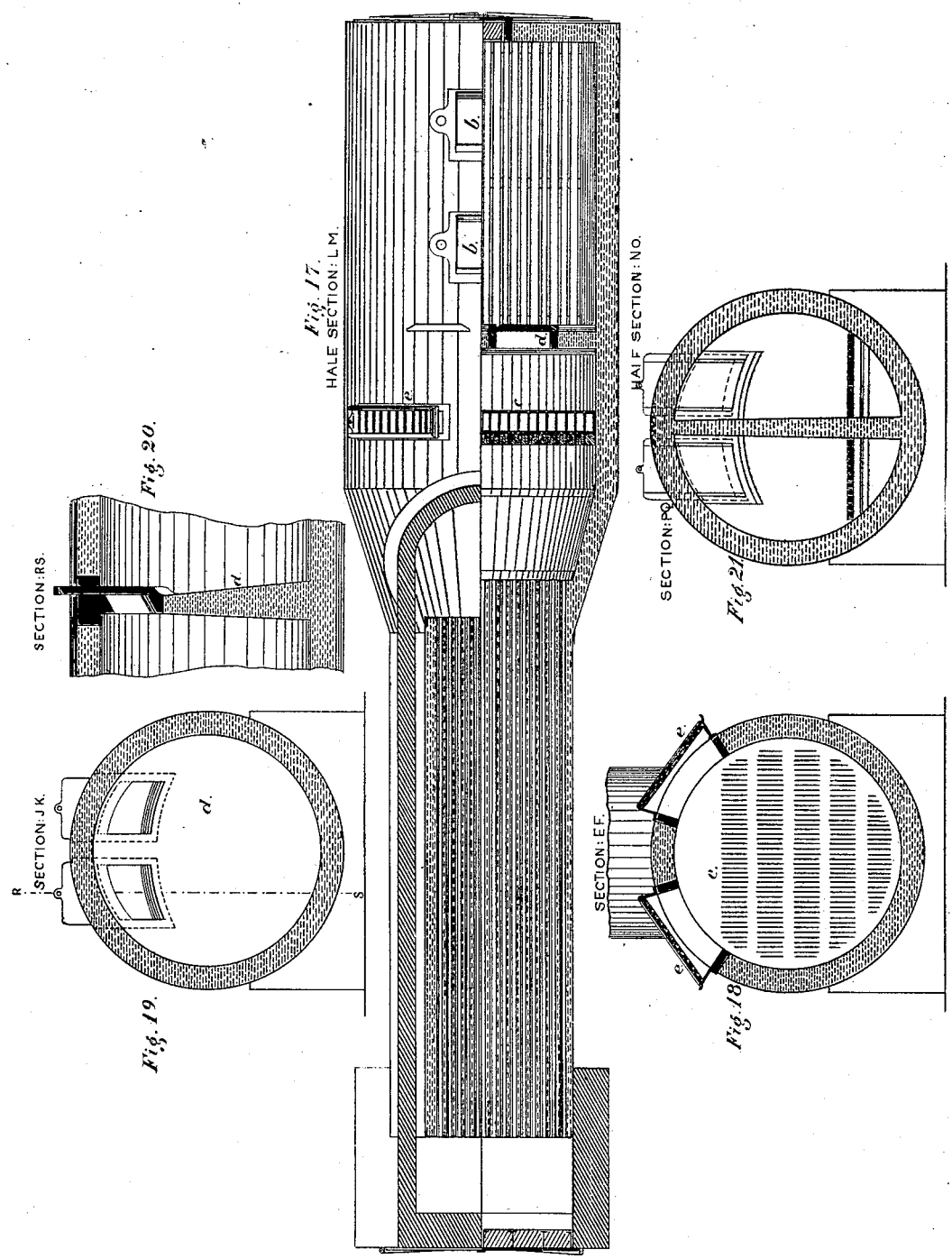

UNITED STATES PATENT OFFICE.

ZOHETH S. DURFEE, OF NEW YORK, N. Y.

IMPROVEMENT IN FIRE-BOXES FOR LOCOMOTIVE AND OTHER BOILERS.

Specification forming part of Letters Patent No. 167,079, dated August 24, 1875; application filed February 20, 1875.

*To all whom it may concern:*

Be it known that I, ZOHETH S. DURFEE, of the city and State of New York, have invented a new and Improved Construction of Fire-Boxes of Locomotive and other Boilers, of which the following is a specification:

My invention consists in new and improved arrangements for developing gas in boiler-furnaces, and consuming it in the generation of steam in the boilers, especially as applied to locomotive and other horizontal boilers, which are described in the following specification and shown in the accompanying drawings.

Sheets 1, 2, and 3 show the details of my plans as carried out in locomotive-boilers; and Sheets 4 and 5 show my plans as carried out in horizontal boilers for use on land and in steam-ships.

Figure 16:
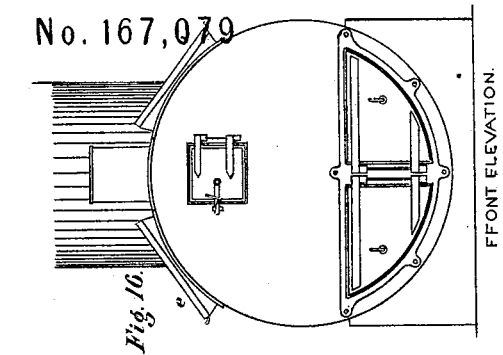
Figure 15:
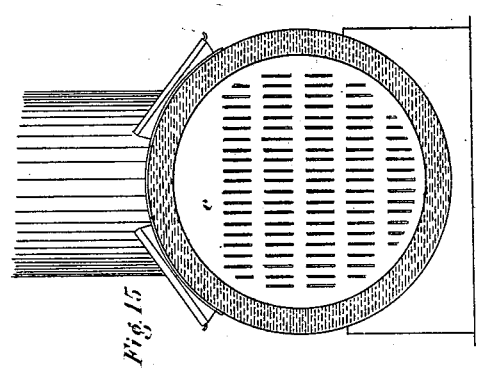
Figure 14:
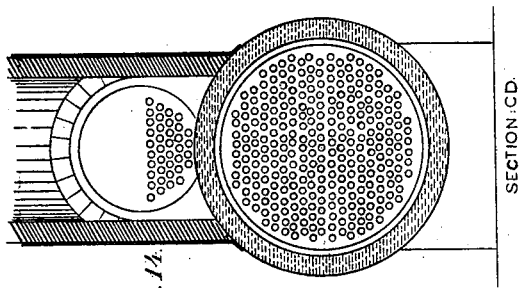
Figure 13:
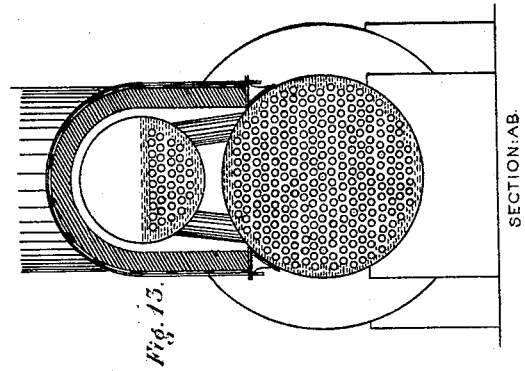
Figure 12:
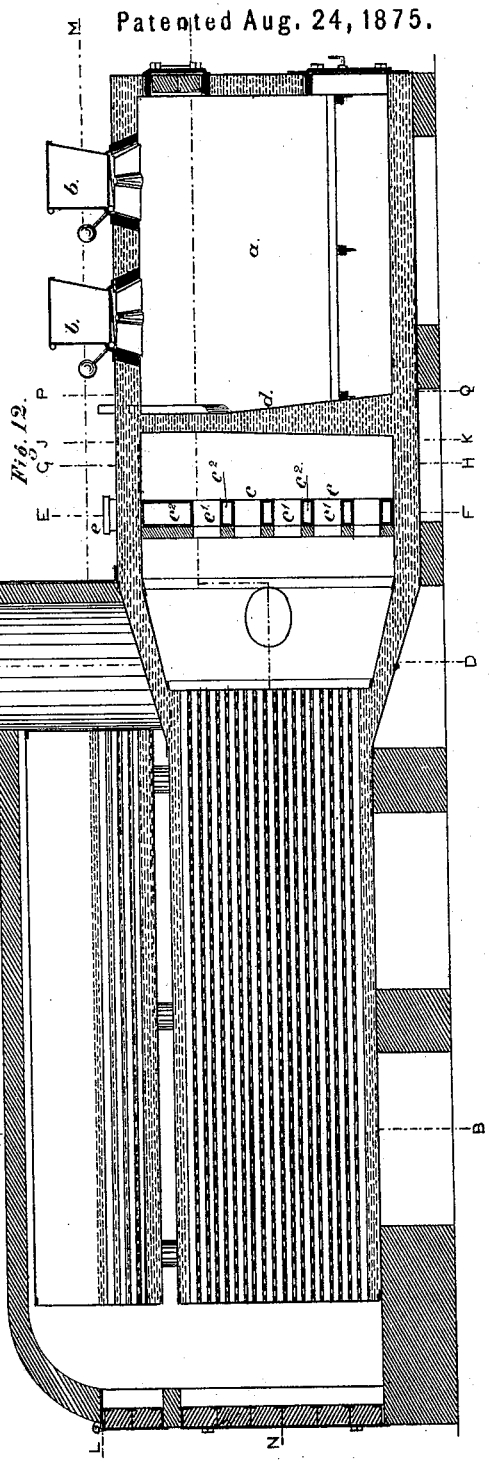

Figure 1, Sheet 1, is a vertical longitudinal section of one form of my locomotive-boiler; Figs. 2, 3, and 4, Sheet 1, and Fig. 5, Sheet 2, sections of the boiler, as indicated by the lines and letters on Fig. 1; and Figs. 6, 7, and 8, Sheet 2, details of the grates; Figs. 9, 10, and 11, Sheet 3, show plans and sections of gas-burning diaphragms used in my constructions. Fig. 12, Sheet 4, is a vertical section of a horizontal stationary boiler; Figs. 13, 14, and 15, various cross-sections; Fig. 16, a front elevation. Fig. 17, Sheet 5, is a half-plan view and half-horizontal section, and Figs. 18, 19, 20, and 21, sections of same, showing details.

In the several drawings the same letters indicate the same parts.

$a\ a$ are the fire or fuel boxes; $b\ b$, the feeding-hoppers; $c\ c$, the gas-burning diaphragms; $d\ d\ d^*$, water-diaphragms containing valves, which regulate the supply of gas to the gas-burning diaphragms.

The gas-burning diaphragms may be made of fire-brick in the manner set forth in my patent No. 130,200 aforesaid; but the form of diaphragm shown on Sheet 3 has been specially designed for the class of boilers under consideration.

These diaphragms are made partly of iron and partly of brick, the brick portion $c^4$ being dovetailed to the iron portion $c$, as shown, or is otherwise suitably attached, $c\ c$ being the iron part of the diaphragm. $c^1\ c^1\ c^1$ are the tubes through which the gases from the fuel-chambers $a\ a$ pass to be burned. $c^2\ c^2$ are the air-spaces in the diaphragm, communicating with the air-box $e$ in Fig. 1, and the valves $e$ $e$ in Figs. 12, 17, and 18.

The fire-bricks $c^4\ c^4$ have their joints in the line of the gas-tubes $c^1\ c^1$ of the diaphragm $c$ $c$, as shown in Fig. 11, though they may be made in larger sections, if desired, and they contain numbers of diverging air-passages, (shown in section in Fig. 10,) by which the air which circulates through the air-passages $c^2\ c^2$, and passes through the openings $c^3\ c^3$ into them, is brought into intimate mixture with the gases passing through $c^1\ c^1$.

The half-section, Fig. 9, on R S is taken looking toward the top of the cast-iron diaphragm $c\ c$, and shows the relations of the tubes $c^1\ c^1$ and the air-spaces $c^2\ c^2$ and outlets $c^3\ c^3$, and it will be seen that, in passing to mix with the gases, the air will have a considerable circulation in the heated passages of the diaphragm $c\ c$, and so be fitted for producing, by combination with the gases, a high heat.

The water-diaphragms $d\ d\ d^*\ d^*$, with the valves in them, are used for controlling the quantity of gas consumed, and for enabling the fuel-chamber to be entirely shut off from the combustion-chamber, and the generation of steam to be thus almost entirely stopped, without removing the fuel in the fuel-chambers.

When the valves in these diaphragms are closed and the draft or blast under the grates shut off, the fuel in the furnace or fuel-chambers will smolder with but very little waste or combustion, and without any very rapid development of steam in the boiler, the major part of which then radiating without absorbing heat.

Should too much steam be generated by this smoldering fire, it may be condensed in the tubular portion of the boiler by letting cold air through the combustion-diaphragm into the tubes of the boilers.

These water-diaphragms are good generators of steam, as when the boilers are in full operation they will have hot gases on both their surfaces.

If desired, there may be substituted for these water-diaphragms others made of metal protected by fire-brick, or they may be made entirely of fire-brick, or any suitable refractory material.

In the locomotive-boiler, Fig. 1, I put a water-diaphragm midway, or nearly so, as I may choose, of the fuel-chamber, and I make the lower part of the diaphragm forked, so as to permit the hindmost axle of the locomotive to be put between these forks.

In this wise I get a larger grate area than usual without lengthening the wheel-base of the locomotive, and I am also then able to burn fuel in the front fuel-chamber under different pressures and conditions from what I do in the rear chamber; and, also, when it is desired to house the engine for a time, the fire in the front chamber can be dropped out, as usual, leaving fuel in the other fuel-chamber in a smoldering condition, to keep the water in the boiler up to nearly the steam-point, and thus facilitate the rapidity with which the locomotive can be set at work again.

If desired, a water-diaphragm with a valve or valves may be put in the front fuel-chamber, as shown in dotted lines at $d^*$ $d^*$ in Fig. 1, and for small locomotives, that would be the construction proper, the rear fuel-chamber being unnecessary.

In the horizontal stationary boilers the space between the water-diaphragms and the combustion-diaphragms needs only to be large enough for a good distribution of the gas to the combustion-diaphragm.

The valves in the water-diaphragm may be made large enough to give access to this space, and it may be well in some cases to have a man-hole in the side of the boiler to give access thereto when the fuel-chamber is heated; but I do not show such a man-hole in the drawings.

I construct man-holes leading into the combustion-chamber between the combustion-diaphragms and the tube-sheets of all the boilers, in order to give access for cleaning and resetting the tubes, and repairing the combustion-diaphragms.

As will be seen, all the boilers are fitted with feeding-hoppers to the fuel-chambers, which are necessary for comfortable, if not safe, working. In case, however, it is desired to fire the boilers with wood, I make a door or doors in the end of the boilers, as shown in Figs. 12 and 16, Sheet 4, and then when it is desired to feed the boiler, the gas-valve in the water-diaphragm must be closed before the feeding-doors are opened, to prevent an explosion of the gas in the fuel-chamber.

For land-boilers and boilers on steamboats using wood as a fuel, when only one or two boilers are used, I would divide the fire-boxes lengthwise by a water-diaphragm, each space thus made having a gas-valve and a feeding-door, so that the spaces can be shut off and fed alternately, without an entire stoppage of the flow of gas to the combustion-diaphragms, and this plan is shown in vertical cross-section in Fig. 21.

The horizontal boilers in Figs. 12 and 17 are shown as fitted for burning either wood or coal, having feeding-hoppers as well as end doors. When wood is used the trap-doors of the hoppers should be taken out and be replaced with fire-brick or other suitable material.

On the flanged sides of the hoppers I make sight-holes, closed by suitable stoppers, through which the fires can be observed and stirred. I also put sight-holes in the man-hole plates of the combustion-chambers. These man-hole plates must also be lined or faced internally with some fire-resisting material, or the holes may be closed entirely with plates of such material.

I have shown on Sheet 2, in Figs. 6, 7, and 8, drawings of grates which I find specially desirable for use when a large quantity of fuel is required to be burned within a contracted area in a short time, and which are to be preferred for use in locomotives and steamboat-boilers; but as these grates are subject of another specification I do not herein and now claim them. Neither do I in this specification claim, broadly, the use of combustion-diaphragms in burning fuel as a gas; but reserving my right to claim in a new application all new features of boiler construction applicable to ordinary boilers not claimed herein, but shown in my accompanying drawings

I claim—

1. In locomotive and other horizontal boilers designed for burning fuel as a gas, fuel-combustion chambers contained within the water-walls of the boilers, divided by gas-burning diaphragms, through which all the gases generated in the fuel-chambers and the air effecting their combustion, pass and mingle in fine converging streams or jets, substantially as described and shown.

2. The diaphragm specially designed for these boilers, constructed of iron, with iron pipes for the flow of the gases from the fuel-chamber, in such wise as that the air to be combined with the heated gases produced in the fuel-chamber shall circulate around the iron pipes in the diaphragms through which the gases pass to the combustion-chamber, and thus become highly heated before the combination occurs, while preventing the overheating of the iron casing, substantially as described and shown.

3. Water or other gas-tight and heat-resisting diaphragms, provided with gas-tight valves in them, and arranged so as to divide and entirely separate the different fuel-chambers, when more than one is used, and enable each fuel-chamber to be more or less completely shut off from the gas-distributing chamber and combustion-diaphragm, substantially as described and shown.

4. The combination of the gas-producing chambers, gas-distributing chambers, gas-burning diaphragms, and combustion-chambers in gas-burning boilers, substantially as herein described and shown.

5. In boilers constructed to burn gas from either wood or coal, or both, the combination of transverse diaphragms containing valves, with longitudinal water-diaphragms separating the fuel-chamber into two or more distinct chambers, substantially as described and shown.

ZOHETH S. DURFEE.

Witnesses:
J. B. WHITE,
F. W. EDMUNDS.